US010897088B2

(12) United States Patent
Mobius (10) Patent No.: US 10,897,088 B2
(45) Date of Patent: Jan. 19, 2021

(54) LEAKY-WAVE SLOTTED MICROSTRIP ANTENNA

(71) Applicant: Arnold Mobius, Neubiberg (DE)

(72) Inventor: Arnold Mobius, Neubiberg (DE)

(73) Assignee: VEONEER SWEDEN AB, Vargarda (SE)

( * ) Notice: Subject to any disclaimer, the term of this patent is extended or adjusted under 35 U.S.C. 154(b) by 0 days.

(21) Appl. No.: 16/095,142

(22) PCT Filed: Apr. 21, 2016

(86) PCT No.: PCT/EP2016/058845
§ 371 (c)(1),
(2) Date: Oct. 19, 2018

(87) PCT Pub. No.: WO2017/182077
PCT Pub. Date: Oct. 26, 2017

(65) Prior Publication Data
US 2019/0148822 A1    May 16, 2019

(51) Int. Cl.
| | |
|---|---|
| *H01Q 1/32* | (2006.01) |
| *H01Q 13/20* | (2006.01) |
| *H01Q 21/06* | (2006.01) |
| *H01Q 21/00* | (2006.01) |
| *G01S 13/931* | (2020.01) |

(Continued)

(52) U.S. Cl.
CPC ......... *H01Q 13/206* (2013.01); *G01S 13/931* (2013.01); *H01Q 1/3233* (2013.01); *H01Q 1/3283* (2013.01); *H01Q 9/045* (2013.01); *H01Q 13/106* (2013.01); *H01Q 21/0006* (2013.01); *H01Q 21/0075* (2013.01); *H01Q 21/061* (2013.01); *G01S 2013/93271* (2020.01)

(58) Field of Classification Search
CPC .......................... H01Q 13/206; H01Q 13/106
See application file for complete search history.

(56) References Cited

U.S. PATENT DOCUMENTS

| | | | | |
|---|---|---|---|---|
| 4,021,810 A | * | 5/1977 | Urpo ...................... | H01Q 11/04 343/731 |
| 4,180,817 A | * | 12/1979 | Sanford ............... | H01Q 13/206 342/375 |

(Continued)

FOREIGN PATENT DOCUMENTS

EP    2713441 A1    9/2013

OTHER PUBLICATIONS

International Search Report and Written Opinion dated Nov. 10, 2016.

(Continued)

*Primary Examiner* — Ab Salam Alkassim, Jr.
(74) *Attorney, Agent, or Firm* — Dickinson Wright PLLC (57) ABSTRACT

A microstrip antenna includes at least one dielectric material forming a dielectric layer structure having a first main side, at least one antenna structure formed on the first main side; and a ground plane. The dielectric layer structure is positioned between said antenna structure and the ground plane (19, 43). Each of said at least one antenna structure comprises a microstrip conductor that in turn comprises a slot structure. For each of said at least one antenna structure, the microstrip conductor and the slot structure mainly extend in the direction of a longitudinal extension.

5 Claims, 6 Drawing Sheets

(51) Int. Cl.
H01Q 9/04 (2006.01)
H01Q 13/10 (2006.01)

(56) References Cited

U.S. PATENT DOCUMENTS

| | | | | | |
|---|---|---|---|---|---|
| 4,180,818 | A | * | 12/1979 | Schwartz | H01Q 13/206 343/700 MS |
| 4,475,107 | A | * | 10/1984 | Makimoto | H01Q 11/02 343/700 MS |
| 6,147,658 | A | * | 11/2000 | Higashi | H01Q 3/12 333/167 |
| 10,120,063 | B1 | * | 11/2018 | Izadian | H01Q 21/0037 |
| 10,424,825 | B2 | * | 9/2019 | Talty | H01Q 13/28 |
| 10,756,446 | B2 | * | 8/2020 | Ahmadloo | H01Q 1/523 |
| 2004/0201525 | A1 | * | 10/2004 | Bateman | H01Q 13/206 343/700 MS |
| 2004/0227664 | A1 | * | 11/2004 | Noujeim | H01Q 1/38 343/700 MS |
| 2005/0012667 | A1 | * | 1/2005 | Noujeim | H01Q 1/38 343/700 MS |
| 2007/0273528 | A1 | * | 11/2007 | Burkholder | H01Q 1/007 340/572.7 |
| 2010/0060457 | A1 | * | 3/2010 | Burnside | H01Q 1/2216 340/572.7 |
| 2011/0254747 | A1 | * | 10/2011 | Haridim | H01Q 1/243 343/722 |
| 2012/0096942 | A1 | | 4/2012 | Hayashi et al. | |
| 2014/0347234 | A1 | * | 11/2014 | Caloz | H01Q 13/206 343/756 |
| 2014/0375525 | A1 | * | 12/2014 | Shi | H01Q 21/0037 343/893 |
| 2015/0255867 | A1 | * | 9/2015 | Inoue | H01Q 1/38 343/853 |
| 2015/0255870 | A1 | * | 9/2015 | Okunaga | H01Q 13/206 343/700 MS |
| 2015/0372390 | A1 | * | 12/2015 | Gregoire | H01Q 13/26 343/778 |
| 2016/0259047 | A1 | * | 9/2016 | Blech | G01V 8/005 |
| 2017/0293028 | A1 | * | 10/2017 | Trummer | H01Q 3/26 |
| 2018/0115084 | A1 | * | 4/2018 | Tsuchiya | H01Q 21/0075 |
| 2018/0267139 | A1 | * | 9/2018 | Park | H01Q 21/08 |
| 2018/0284216 | A1 | * | 10/2018 | Aoki | H01Q 21/08 |
| 2019/0245276 | A1 | * | 8/2019 | Li | H01Q 1/3233 |
| 2019/0326684 | A1 | * | 10/2019 | Achour | G01S 13/02 |
| 2020/0028275 | A1 | * | 1/2020 | Ahmadloo | H01Q 1/38 |
| 2020/0127386 | A1 | * | 4/2020 | Yekan | H01P 5/08 |

OTHER PUBLICATIONS

Chang, B.C.C., et al., "A Reconfigurable Leaky Mode/Patch Antenna Controlled by PIN Diode Switches," Department of Electrical Engineering, IEEE, 199, 0-7803-5639-X.

Chen, Tai-Lee, et al., "Microstrip-Fed Microstrip Second Higher Order Leaky-Mode Antenna," IEEE Transactions on Antennas and Propagation, vol. 49, No. 6, Jun. 2001.

Qian, Y., et al., "High Efficiency and Broadband Excitation of Leaky Mode in Microstrip Structures", 1999 IEEE MTT-S Digest, pp. 1419-1422.

Menzel, Wolfgang, "A New Travelling Wave Antenna in Microstrip", downloaded Jul. 17, 2020 from IEEE Xplore, pp. 302-306.

Lin, Yu-De, et al., "Analysis and Design of Feeding Structures for Microstrip Leaky Wave Antenna", IEEE Transactions on Microwave Theory and Techniques, vol. 44, No. 9, Sep. 1996, pp. 1540-1547, downloaded Jul. 17, 2020, from IEEE Xplore.

Karmokar, Debabrata K., et al. "Periodic U-Slot-Loaded Dual-Band Half-Width Microstrip Leaky-Wave Antennas for Forward and Backward Beam Scanning", IEEE Transactions on Antennas and Propagation, vol. 63, No. 12, Dec. 2015, pp. 5372-5381, downloaded Jul. 17, 2020, from IEEE Xplore.

* cited by examiner

LEAKY-WAVE SLOTTED MICROSTRIP ANTENNA

CROSS-REFERENCE TO RELATED APPLICATIONS

This application is a 35 U.S.C. § 371 national phase application of PCT International Application No. PCT/EP2016/058845, filed Apr. 21, 2016, the contents of which are incorporated herein by reference in their entirety.

DESCRIPTION OF THE DISCLOSURE

The present disclosure relates to a microstrip antenna that comprises at least one dielectric material having a first main side and at least one antenna structure formed on the first main side, and a ground plane.

Many vehicle radar systems comprise radar transceivers that are arranged for generating radar signals that are transmitted in a transmitter, reflected and received in a receiver. The radar signals may for example be in the form of FMCW (Frequency Modulated Continuous Wave) signals.

For reception and transmission of such signals, vehicle radar systems comprises radar antennas for both reception and transmission, where these antennas are formed in many ways. Radar antennas are normally arranged to perform scanning in an azimuth direction, today often by means of digital beam forming. This means that in the azimuth plane, a broad antenna beam illuminating the entire angular area of interest has to be radiated. As the trend in automotive radars is to cover as much of the car external surfaces as possible, this angular space would ideally be ±90° to minimize the number of radar antennas needed around the car.

Orthogonal to the azimuth direction, in the elevation direction, the antenna beam is focused into a narrow antenna beam, such that the radiated energy is maximized towards the horizon. This provides maximum range.

Microstrip patch antennas are commonly used as automotive radar antennas, where radiating patches are etched on a top layer of a dielectric material, such as for example a PCB (Printed Circuit Board) material, a PTFE (Polytetrafluoroethylene) based material or a ceramic material. At the bottom layer of the dielectric material, or at a certain distance from said bottom layer, there is a ground plane. Microstrip patch antennas are normally designed as linear array antennas where a string of patches are interconnected and fed at an antenna port that serves as a feeding point. The patches may taper along the length of the array to create the desired elevation pattern.

A challenge of this type of design is that patches inherently have an azimuth beamwidth of about ±60°, rather than the desired ±90°, due to the physical width of the patch that has to be maintained at a certain value in order to obtain a suitable radiation efficiency.

Other types of antenna designs have been employed, for example slot antennas that have been built up as a 3-dimensional structure using vias to confine the electrical field. In order to obtain a wider bandwidth, there may be a separate patch antenna for each slot antenna, where the patch antenna is excited by the slot antenna. However, these designs may not accomplish a beam width of about ±90°, and create complications since it requires vias and/or several dielectric layers where all dielectric layers and possible vias must be well aligned. Even small misalignments can result in leakage or imperfect radiation patterns.

The object of the present disclosure is thus to provide a microstrip antenna that is relatively uncomplicated being able to accomplish an azimuth beamwidth of about ±90°. The microstrip antenna may be used in a vehicle radar system.

This object is achieved by means of a microstrip antenna that comprises: at least one dielectric material forming a dielectric layer structure having a first main side,
at least one antenna structure formed on the first main side, and
a ground plane.

The dielectric layer structure is positioned between said antenna structure and the ground plane. Each antenna structure comprises a microstrip conductor that in turn comprises a slot structure. For each of said at least one antenna structure, the microstrip conductor and the slot structure mainly extend in the direction of a longitudinal extension.

According to an example, the slot structure divides the microstrip conductor in a first conductor part and a second conductor part that extend parallel to each other. The slot structure has a varying width that varies step-wise between different values and for different lengths along the longitudinal extension.

According to another example, the first conductor part and the second conductor part are fed with different phases; suitably the conductor parts are fed with a phase difference of 180°.

According to another example, the microstrip conductor has a conductor width, where the slot structure is constituted by at least one separate slot. Each slot has a corresponding slot width that falls below the conductor width.

According to another example, the microstrip conductor is arranged for propagation of the second order mode.

Other examples are disclosed in the dependent claims.

A number of advantages are obtained by means of the present disclosure. Mainly, a microstrip antenna that is relatively uncomplicated and that is able to accomplish an azimuth beamwidth of about ±90° is provided. The microstrip antenna is suitable for use in a vehicle radar system.

BRIEF DESCRIPTION OF THE DRAWINGS

The present disclosure will now be described more in detail with reference to the appended drawings, where.

DETAILED DESCRIPTION

Figure 1:
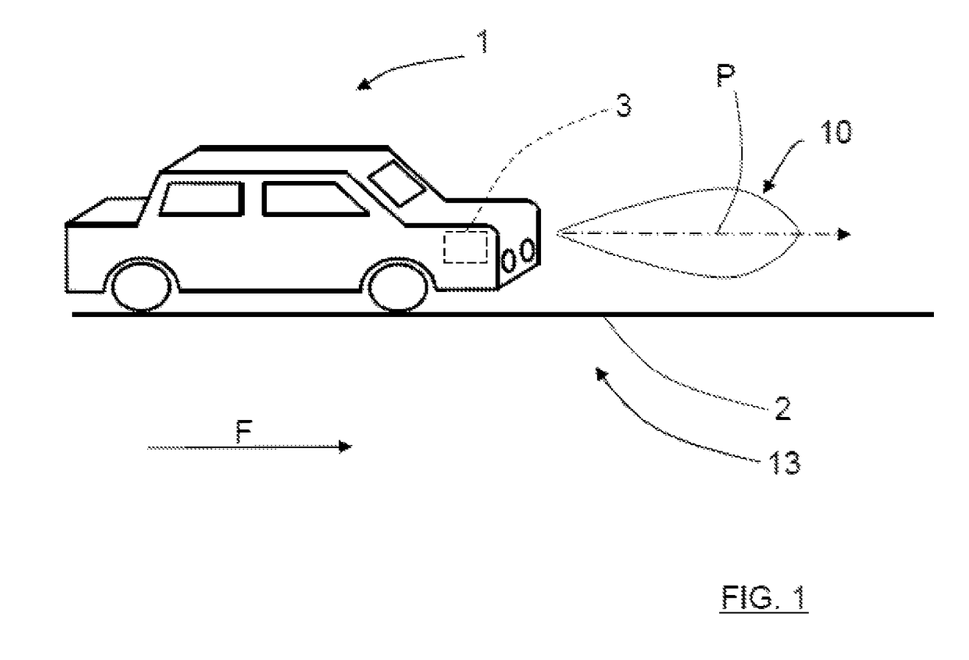
FIG. 1 shows a schematic side view of a vehicle.

FIG. 1 schematically shows a side view a vehicle 1 that runs on a road 2 in a forward direction F with a certain vehicle velocity, where the vehicle 1 comprises a vehicle radar system 3 which is arranged to distinguish and/or resolve single targets from the surroundings by using a Doppler effect in a previously well-known manner, i.e. successive echoes from the same point are superimposed and identified by means of Doppler effect. In this example, the radar system 3 has a main field of view 10 that is aimed in a pointing direction P that extends more or less in the same direction as the forward direction F.

Figure 2:
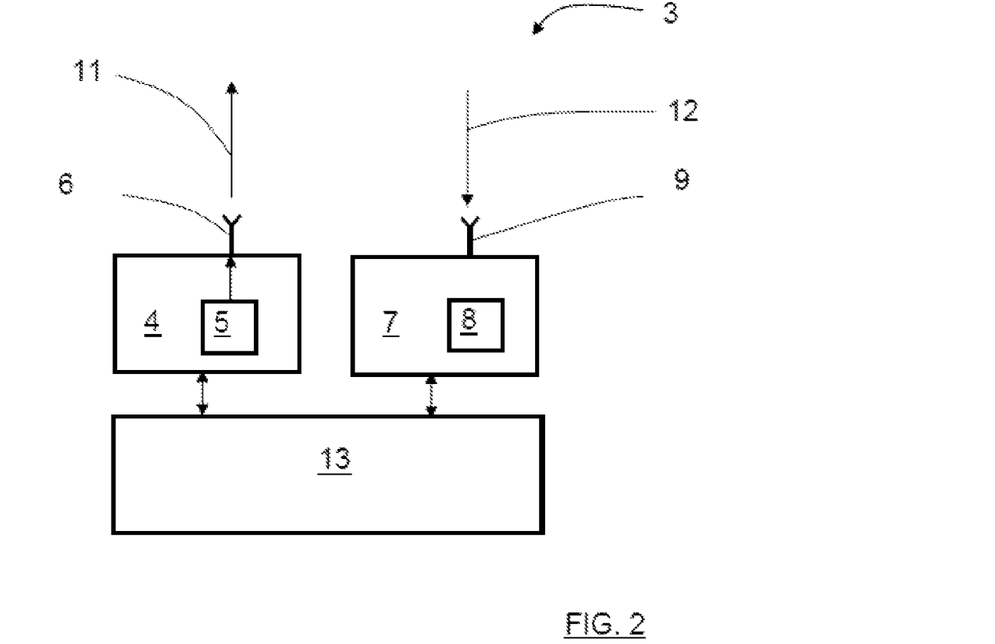
FIG. 2 shows a schematic and simplified view of a radar system.

With reference also to FIG. 2, showing a schematic and simplified view of the radar system 3, the radar system 3 comprises a transmitter arrangement 4 which in turn comprises a signal generator 5 and a transmitter antenna arrangement 6. The vehicle radar system 3 further comprises a receiver arrangement 7, which in turn comprises a receiver 8 and a receiver antenna arrangement 9. In this example, FMCW (Frequency Modulated Continuous Wave) signals are transmitted in a previously well-known manner, such a signal comprising a plurality of FMCW ramps. The radar system 3 also comprises a control unit 13 that may be regarded as a control unit arrangement that is in the form of one unit or several units that either co-operate or handle different tasks more or less independently. The control unit 13 is according to some aspects arranged to control the transmitter arrangement 4 and the receiver arrangement 7, and to process the received signals.

Figure 3:
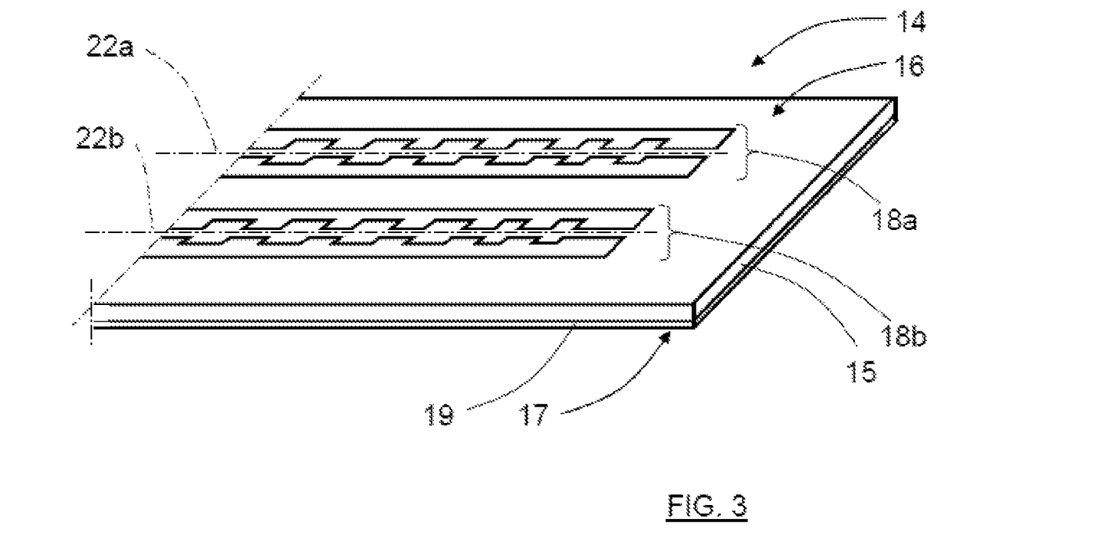
FIG. 3 shows a schematic top perspective partial view of a first example of a microstrip antenna.

With reference to FIG. 3, showing a top perspective partial view of a first example of a microstrip antenna 14, there is a dielectric material 15 forming a dielectric layer having a first main side 16 and a second main side 17. The first main side 16 comprises two antenna structures 18a, 18b that have been etched from an initial copper layer on the first main side 16. The antenna structures 18a, 18b are running parallel to each other along a respective longitudinal extension 22a, 22b, forming a two-dimensional array antenna structure. The second main side 17 comprises a copper layer that constitutes a ground plane 19.

Figure 4:
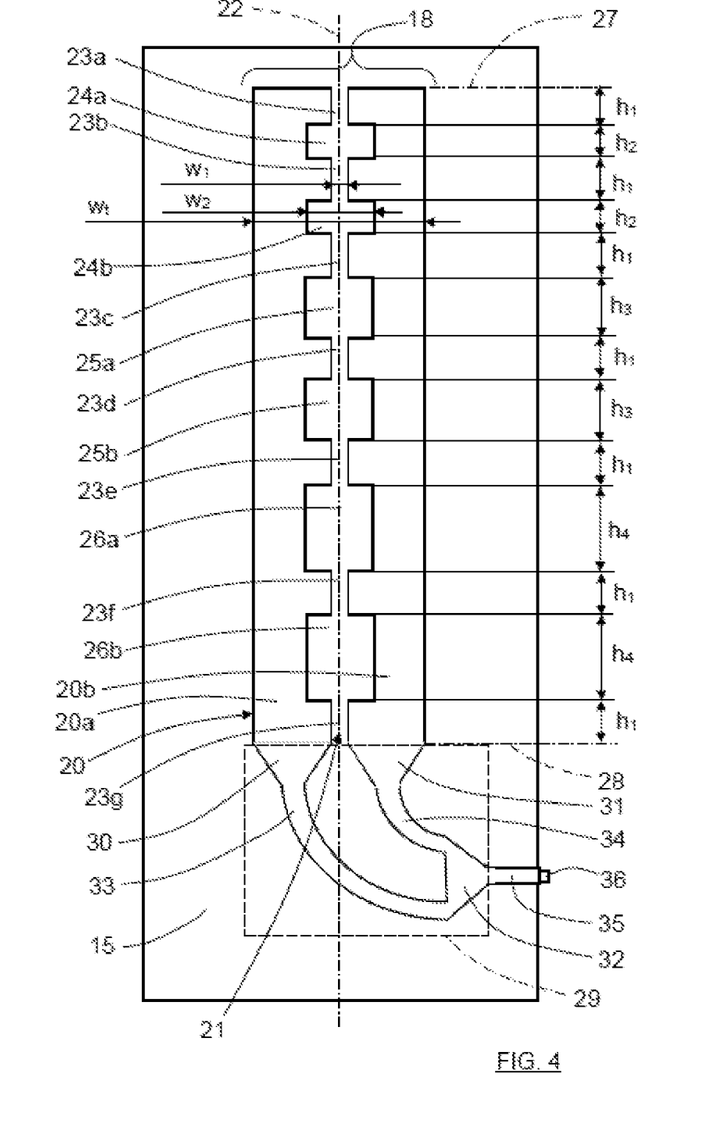
FIG. 4 shows a schematic top view of one antenna structure according to the first example.

According to the present disclosure, also with reference to FIG. 4 showing a detailed top view of one antenna structure 18, an antenna structure 18 comprises a microstrip conductor 20 having a total width wt, which microstrip conductor 20 in turn comprises a slot structure 21, where the conductor and the slot structure 21 extend along a common longitudinal extension 22.

The slot structure 21 divides the microstrip conductor 20 in a first conductor part 20a and a second conductor part 20b that extend parallel to each other. The slot structure 21 has a varying width that varies step-wise between different values and for different lengths along the longitudinal extension.

In the first example as illustrated in FIG. 4, there is a first slot width $w_1$ and a second slot width $w_2$ that exceeds the first slot width $w_1$. All slot parts 23a, 23b, 23c, 23d, 23e, 23f, 23g with the first slot width $w_1$ have a first slot height $h_1$ and these slot parts constitute every second slot part of the slot structure 21, including a first slot part 23a at a second side 27 of the antenna structure 18 and a last slot part 23g at a first side 28 of the antenna structure 18; these slot parts 23a, 23g being positioned at respective ends of the slot structure 21.

Between the two slot parts 23a, 23b, 23c, 23d, 23e, 23f, 23g with the first slot width $w_1$ there is a slot part 24a, 24b; 25a, 25b; 26a, 26b with the second slot width $w_2$. For the slot parts 24a, 24b; 25a, 25b; 26a, 26b with the second slot width $w_2$, from the second side 27 of the antenna structure 18 and towards the first side 28 of the antenna structure 18, there are two slot parts 24a, 24b having a second slot height $h_2$; followed by two slot parts 25a, 25b having a third slot height $h_3$; and followed by two slot parts 26a, 26b having a fourth slot height $h_4$. The second slot height $h_2$ exceeds the first slot height $h_1$, the third slot height $h_3$ exceeds the second slot height $h_2$, and the fourth slot height $h_4$ exceeds the third slot height $h_3$.

The first conductor part 20a and the second conductor part 20b are fed with different phases, here there is a phase difference of 180°. At the first side 28 of the antenna structure 18 the first conductor part 20a and the second conductor part 20b are connected to a power combiner/divider and phase shifter arrangement 29. The phase shifter arrangement 29 comprises a first taper part 30, a second taper part 31 and a third taper part 32, a first phase shifting conductor 33 and a second phase shifting conductor 34. The first phase shifting conductor 33 has a first electrical length $L_1$ and the second phase shifting conductor 34 has a second electrical length $L_2$, where the first electrical length $L_1$ second electrical length $L_2$ have a relative phase difference of 180° at a desired center frequency. The phase difference in electrical length between the phase shifting conductors 33, 34 is thus arranged to inflict a desired phase difference, here optimally 180°.

The first taper part 30 constitutes an impedance matching transition between the first conductor part 20a and the first phase shifting conductor 33, and the second taper part 31 constitutes an impedance matching transition between the second conductor part 20b and the second phase shifting conductor 34. The third taper part 32 constitutes an impedance matching transition between the phase shifting conductors 33, 34 and a port conductor 35 that is connected to an antenna port 36.

In this first example there are thus two parallel microstrip conductor parts 20a, 20b which are not joined, each being arranged to carry a fundamental mode but 180 out of phase with respect to each other. The spacing between the two parallel microstrip conductor parts 20a, 20b is varied stepwise. At any one of these steps in width, a certain fraction of the total power is radiated.

A single microstrip conductor constituted by the port conductor 35 is arranged to carry the fundamental mode, is up-tapered by means of the third taper part 32 and split into the two phase shifting conductors 33, 34, both being arranged to carry the fundamental mode. By means different path lengths of two phase shifting conductors 33, 34, a phase difference of 180° is acquired. When the two phase shifting conductors 33, 34 are connected to the respective microstrip conductor part 20a, 20b at the first taper part 30 and the second taper part 31, respectively, a second order mode, or differential mode, is obtained.

The microstrip antenna 14 according to the first example above provides the desired antenna beamwidth since a slot arrangement is used as a radiator instead of patches. Such a slot arrangement can be made relatively thin and hence transmit over azimuth angles of ±90° without loss of radiated power.

Figure 5:
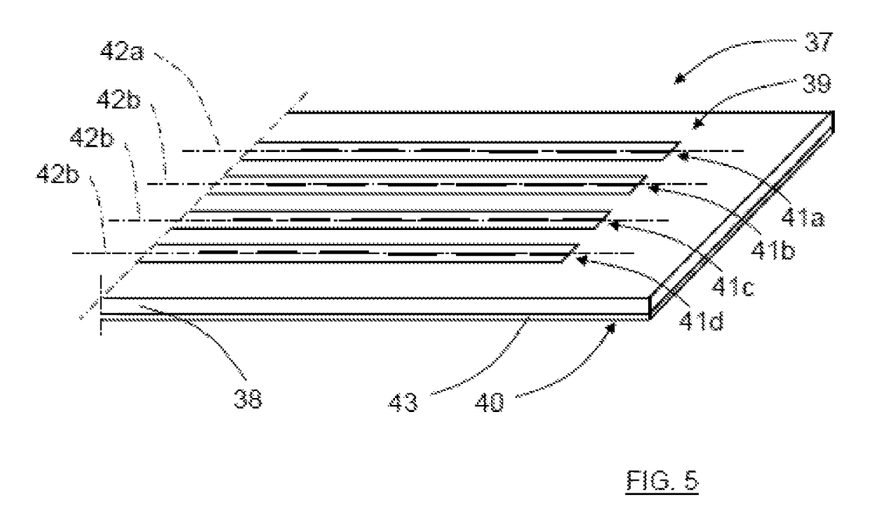
FIG. 5 shows a schematic top perspective partial view of a second example of a microstrip antenna.

With reference to FIG. 5, showing a top perspective partial view of a second example of a microstrip antenna 37, there is a dielectric material 38 forming a dielectric layer having a first main side 39 and a second main side 40. The first main side 39 comprises four antenna structures 41a, 41b, 41c, 41d that have been etched from an initial copper layer on the first main side 39. The antenna structures 41a, 41b, 41c, 41d are running parallel to each other along a respective longitudinal extension 42a, 42b, 42c, 42d forming a two-dimensional array antenna structure. The second main side 40 comprises a copper layer that constitutes a ground plane 43.

Figure 6:
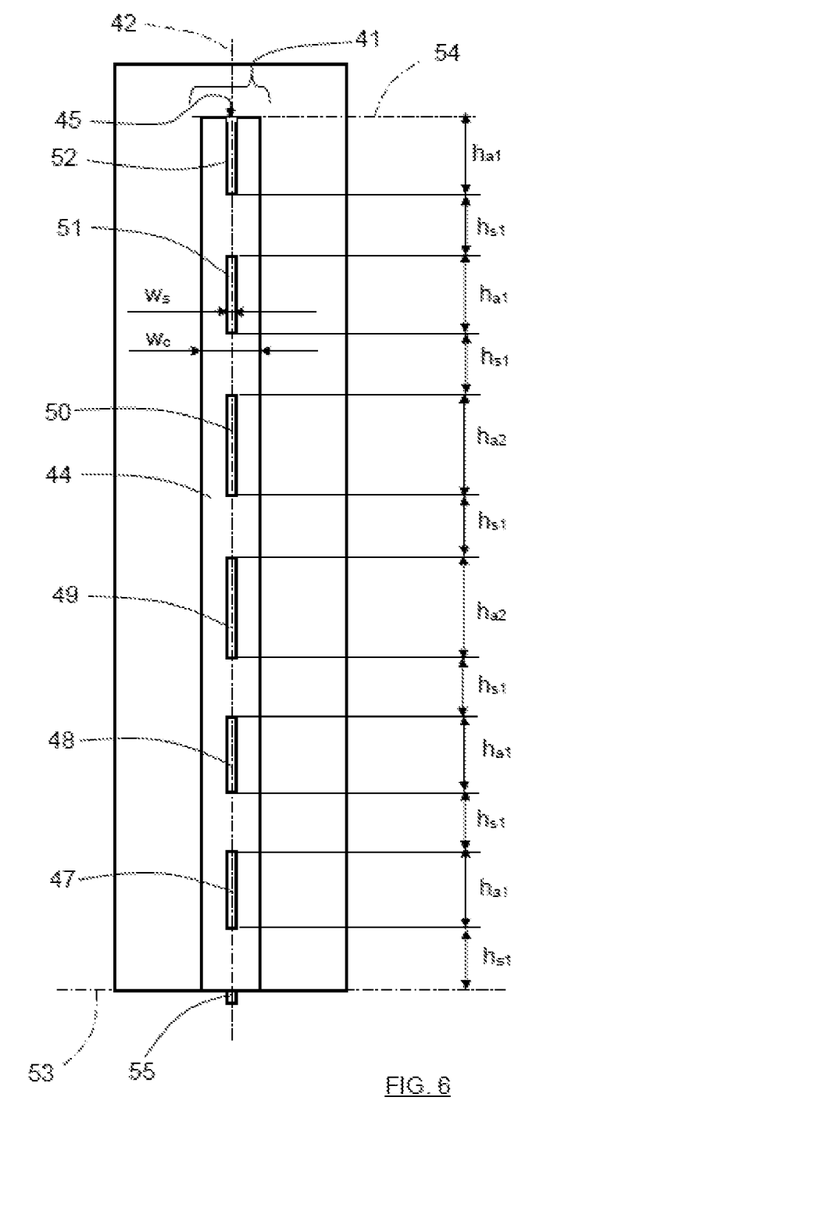
FIG. 6 shows a schematic top view of one antenna structure according to the second example.

In accordance with the present disclosure, also with reference to FIG. 6 showing a detailed top view of one antenna structure 41, an antenna structure 41 comprises a microstrip conductor 44 having a conductor width $w_c$, where the microstrip conductor 44 in turn comprises a slot structure 45, where the microstrip conductor 44 and the slot structure 45 extend along a common longitudinal extension 42.

In the second example as illustrated in FIG. 6, the slot structure is constituted by six separate slots 47, 48, 49, 50, 51, 52, all having a slot width $w_s$ that falls below the conductor width $w_c$. Adjacent slots are separated with a certain first separation height $h_{s1}$, and all slots 47, 48, 49, 50, 51, 52 as well as the microstrip conductor 44 extend symmetrically along the common longitudinal extension 42, from a first side 53 of the microstrip conductor 44 to a second side 54 of the microstrip conductor 44.

At the first side 53 of the conductor there is an antenna port 55, and following the common longitudinal extension 42 towards the second side 54 there is a first separation height $h_{s1}$ followed by two slots 47, 48 having a first slot height $h_{a1}$. Then follows two slots 49, 50 having a second slot height $h_{a2}$, and then follows two slots 51, 52 having the first slot height $h_{a1}$. The last slot 52 reaches the second side 54 such that the microstrip conductor 44 is divided into two parts at the second side 54.

Figure 7:
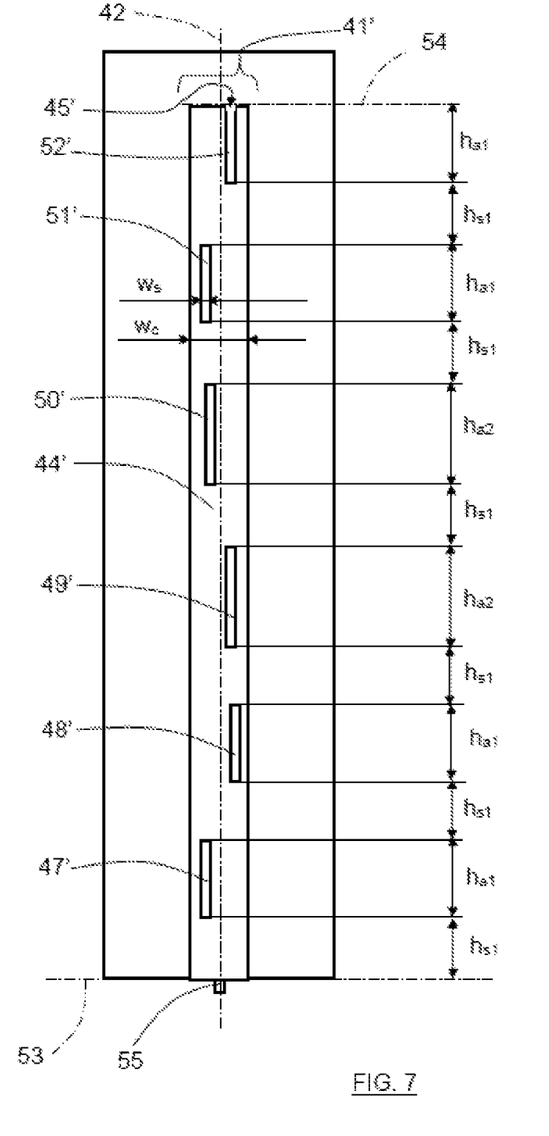
FIG. 7 shows a schematic top view of an alternative antenna structure according to the second example.

The slots may be shifted laterally as shown in FIG. 7; FIG. 7 corresponds to FIG. 6, but there is an alternative antenna structure 41' that comprises alternative microstrip conductor 44' and slot structure 45' where all slots 47', 48', 49', 50', 51', 52' are displaced relative the longitudinal extension 42.

Such lateral displacements are of course conceivable for the slot parts in the first example as well, as long as a coherent slot structure 21 is formed that divides the microstrip conductor 20 in a first conductor part 20a and a second conductor part 20b. Here, the microstrip conductor 44 and the slot structure 45 mainly extend in the direction of the longitudinal extension 42.

Generally, according to some aspects, at least one slot is displaced relative the longitudinal extension 42.

The width $w_s$ of each slot 47, 48, 49, 50, 51, 52; 47', 48', 49', 50', 51', 52' can be made as small as necessary to achieve a desired beamwidth in the far field without decreasing radiation efficiency. According to some aspects, two or more slots, or even all slots, have different widths and/or lengths and/or different separation heights.

The microstrip conductor 44, 44' shown in FIG. 6 and FIG. 7 does not carry the fundamental mode but the second order mode, similar to the differential mode; the currents propagate in transverse direction and since they are intercepted by the slots 47, 48, 49, 50, 51, 52; 47', 48', 49', 50', 51', 52', the disruption results in radiation. A properly designed sequence of slots 47, 48, 49, 50, 51, 52; 47', 48', 49', 50', 51', 52' leads to a phased array antenna. The microstrip conductor 44 is thus designed such that the second order mode propagates.

A second order mode slot antenna can also be regarded as a sequence of alternatively a broad single strip line carrying the second order mode and two parallel narrow lines each of them carrying the fundamental mode but 180° out of phase with respect to each other. At the transition section mode, coupling occurs and the remaining fraction is radiated. This radiated fraction cannot be kept below a certain threshold which is a disadvantage when one tries to tailor a certain amplitude distribution along the phased array antenna.

The present disclosure is not limited to the examples above, but may vary freely within the scope of the appended claims. For example, the radar system may be implemented in any type of vehicle such as cars, trucks and buses as well as boats and aircraft.

For the first example, the slot parts may have any configurations regarding lengths, widths and symmetry; here the wider slot parts 24a, 24b; 25a, 25b; 26a, 26b with the second slot width $w_2$ are shown having a same height pair-wise, but they may all have different heights and widths, or in any other combinations such as every second, triple-wise etc. In the same way the slot parts 23a, 23b, 23c, 23d, 23e, 23f, 23g with the first slot width $w_1$ are all shown having a first slot height $h_1$, but they may all have different heights and widths. The slot parts should however at least comprise one step in width, and should divide the microstrip conductor 20 in a first conductor part 20a and a second conductor part 20b that extend parallel to each other.

Many different power combiner/divider and phase shifter arrangements are of course conceivable, the one shown only being one example. The result should be that the first conductor part 20a and the second conductor part 20b are fed individually and out of phase with each other; optimally there should be a phase difference of 180° for the center frequency of the frequency band that is used and/or the frequency band that the microstrip antenna 14, 37 is designed for.

There may be two or more slot structures within a common conductor that thus is divided into several parts that are fed similar to the first example, but only with one conductor being fed, not two separated conductor parts as in the first example.

For the second example, each slot may have any suitable individual configuration regarding length, width, position and symmetry, but there should be at least one slot that is positioned in the microstrip conductor 44. There may be at least one slot 52, 52' positioned such that the microstrip conductor 44 is divided into two parts at the second side 54 and/or the first side 53. The slots may be unequally distributed along the common longitudinal extension 42, possibly in combination with the lateral displacement illustrated in FIG. 7.

Two or more slots may be positioned in an at least partial overlapping manner, running parallel to each other. The slots may have any suitable shape such as for example having arrow-ends or similar to increase the effective slot length.

Generally, a microstrip antenna 14, 37 according to the present disclosure comprises at least one antenna structure. A microstrip antenna 14, 37 comprising two or more antenna structures constitutes a two-dimensional array antenna, while one antenna structure constitutes a one-dimensional array antenna.

The microstrip antenna comprises at least one dielectric layer, according to some aspects there is a first dielectric layer onto which there is at least one antenna structure and with no copper on the other side. This first dielectric layer is then placed in a holding frame having a bottom that constitutes a ground plane such that there is an air layer between the first dielectric layer and the ground plane, the air layer thus constituting a second dielectric layer.

Each antenna structure may according to some aspects be cut from a piece of metal sheet, for example by means of laser or water, and suspended over a ground plane by means of dielectric distance pins or similar, or carried by a foam material. Alternatively, each antenna structure is screen-printed onto a suitable carrier material.

All dielectric layers together form a dielectric layer structure that has a first main side 16, where at least one antenna structure is formed on the first main side 16. The dielectric layer structure is positioned between the antenna structure and the ground plane.

The microstrip antenna has here been mentioned for use in a vehicle radar system, but of course the microstrip antenna may be used in any suitable context such as microwave links or similar.

Generally, the present disclosure relates to a microstrip antenna 14, 37 comprising:
at least one dielectric material 15, 38 forming a dielectric layer structure having a first main side 16, 39,
at least one antenna structure 18, 41 formed on the first main side 16, 39; and
a ground plane 19, 43,
where the dielectric layer structure 15, 38 is positioned between said antenna structure 18, 41 and the ground plane 19, 43. Each of said at least one antenna structure 18, 41 comprises a microstrip conductor 20, 44 that in turn comprises a slot structure 21, 45, where, for each of said at least one antenna structure 18, 41, the microstrip conductor 20, 44 and the slot structure 21, 45 mainly extend in the direction of a longitudinal extension 22, 42.

According to an example, the slot structure 21 divides the microstrip conductor 20 in a first conductor part 20a and a second conductor part 20b that extend parallel to each other, where the slot structure 21 has a varying width that varies step-wise between different values and for different lengths along the longitudinal extension 22.

According to an example, the first conductor part 20a and the second conductor part 20b are fed with different phases.

According to an example, the first conductor part 20a and the second conductor part 20b are fed with a phase difference of 180°.

According to an example, the first conductor part 20a and the second conductor part 20b are connected to a phase shifter arrangement 29 that comprises a first phase shifting conductor 33 and a second phase shifting conductor 34, where a difference in electrical length between the phase shifting conductors 33, 34 is arranged to inflict the different phases.

According to an example, the microstrip conductor 44 has a conductor width $w_c$, where the slot structure 45 is constituted by at least one separate slot 47, 48, 49, 50, 51, 52, each of said at least one slot 47, 48, 49, 50, 51, 52 having a corresponding slot width $w_s$ that falls below the conductor width $w_c$.

According to an example, all of said at least one slot 47, 48, 49, 50, 51, 52 as well as the microstrip conductor 44 extend symmetrically along the longitudinal extension 42, forming a common longitudinal extension 42, from a first side 53 of the microstrip conductor 44 to a second side 54 of the microstrip conductor 44.

According to an example, at least one slot 47', 48', 49', 50', 51', 52' is displaced laterally with respect to the longitudinal extension 42.

According to an example, the microstrip conductor 44 is arranged for propagation of a second order mode.

While the above description constitutes the preferred embodiment of the present invention, it will be appreciated that the invention is susceptible to modification, variation and change without departing from the proper scope and fair meaning of the accompanying claims.

The invention claimed is:

1. A microstrip antenna comprising:
at least one dielectric material forming a dielectric layer structure having a first main side;
at least one antenna structure formed on the first main side;
a ground plane;
where the dielectric layer structure is positioned between the antenna structure and the ground plane;
wherein each of the at least one antenna structure comprises a microstrip conductor that comprises a slot structure; and
wherein for each of the at least one antenna structure, the microstrip conductor and the slot structure mainly extend in the direction of a longitudinal extension wherein the slot structure divides the microstrip conductor in a first conductor part and a second conductor part that extend parallel to each other, where the slot structure defines a plurality of slot parts, each of the slot parts defining a first width and a second width, the second width having a greater dimension than the first width, the first and second widths of each of the slot parts being substantially equal in dimension, the slot parts further defining a slot height measured along the longitudinal extension, a first set of one or more of the slot parts defining a first slot height, and a second set of one or more of the slot parts defining a second slot height, the first and second slot heights differing from one another.

2. The microstrip antenna according claim 1, wherein the first conductor part and the second conductor part are fed with different phases.

3. The microstrip antenna according claim 2, wherein the first conductor part and the second conductor part are fed with a phase difference of 180°.

4. The microstrip antenna according to claim 2, wherein the first conductor part and the second conductor part are connected to a phase shifter arrangement that comprises a first phase shifting conductor and a second phase shifting conductor, where a difference in electrical length between the first phase shifting conductor and the second phase shifting conductor is arranged to present the different phases to the first and the second conductors, a first taper part joining the first conductor part with the first phase shifting conductor providing a first impedance matching transition, a second taper part joining the second conductor part with the second phase shifting conductor for providing a second impedance matching transition and a third taper part joining both the first and the second phase shifting conductors to an antenna port.

5. The microstrip antenna according to claim 3, wherein the first conductor part and the second conductor part are connected to a phase shifter arrangement that comprises a first phase shifting conductor and a second phase shifting conductor, where a difference in electrical length between the first phase shifting conductor and the second phase shifting conductor is arranged to present the different phases to the first and the second conductors, a first taper part joining the first conductor part with the first phase shifting conductor providing a first impedance matching transition, a second taper part joining the second conductor part with the second phase shifting conductor for providing a second impedance matching transition and a third taper part joining both the first and the second phase shifting conductors to an antenna port.

* * * * *